May 23, 1933.   L. X. GARFUNKEL   1,911,016
MACHINE FOR PLASTIC MATERIAL
Filed Aug. 22, 1931   3 Sheets-Sheet 1

INVENTOR.
Louis X. Garfunkel
BY
ATTORNEY

May 23, 1933. L. X. GARFUNKEL 1,911,016
MACHINE FOR PLASTIC MATERIAL
Filed Aug. 22, 1931 3 Sheets-Sheet 2
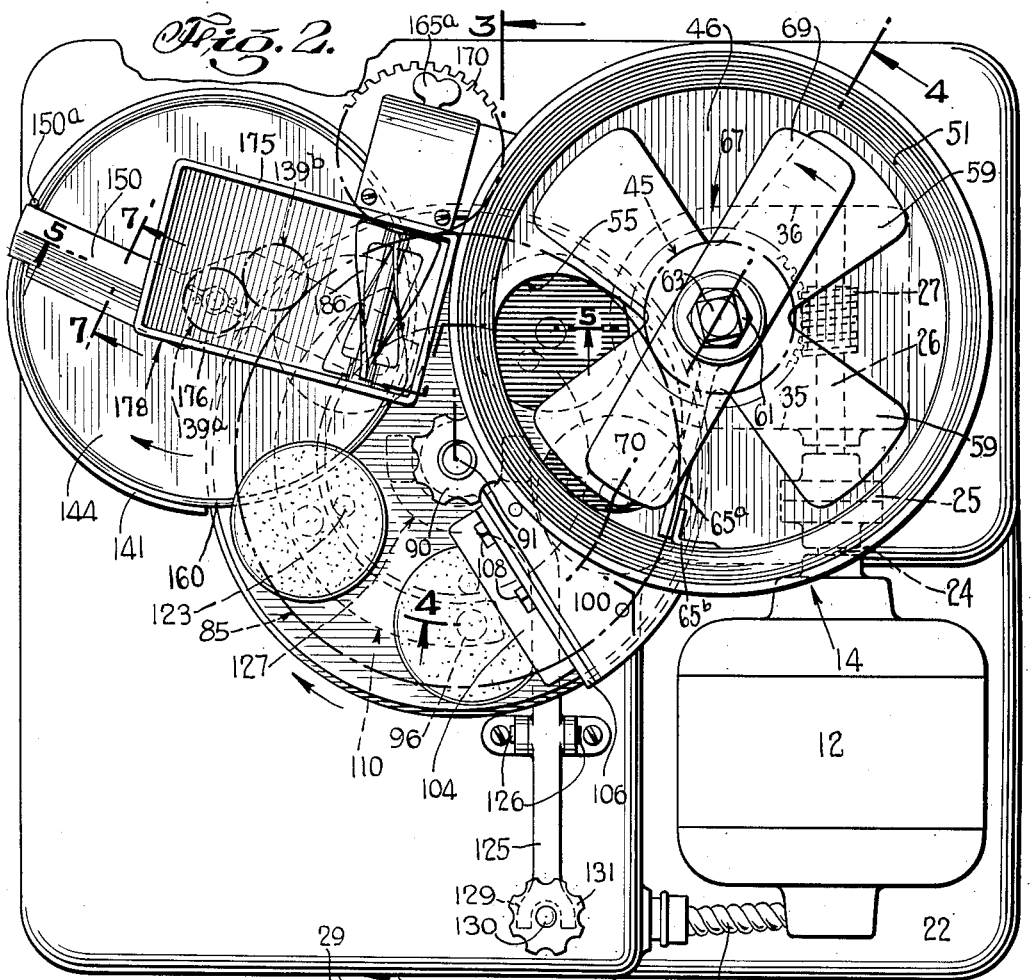
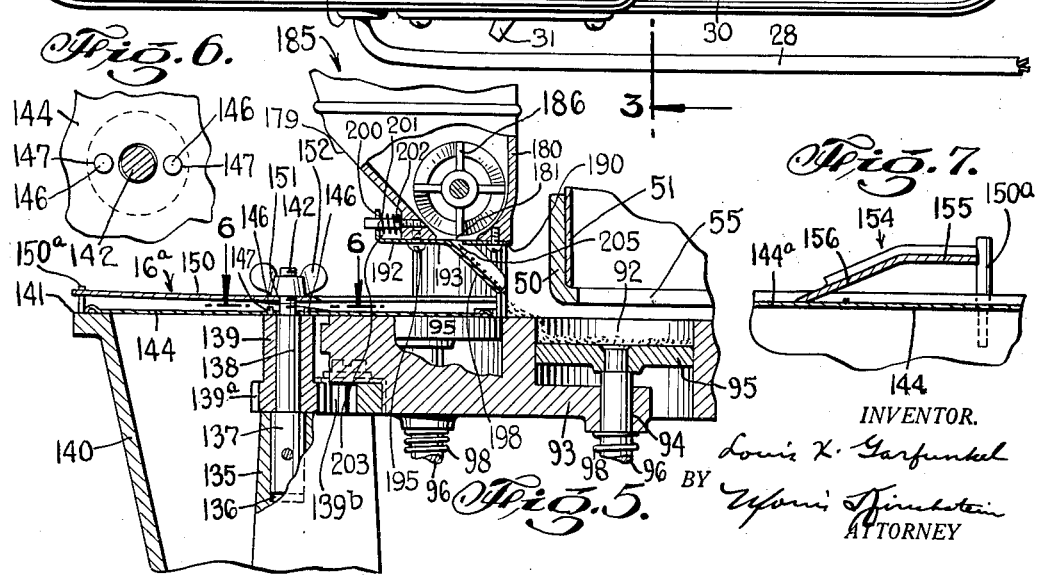
INVENTOR.
Louis X. Garfunkel
BY
ATTORNEY May 23, 1933. L. X. GARFUNKEL 1,911,016
MACHINE FOR PLASTIC MATERIAL
Filed Aug. 22, 1931 3 Sheets-Sheet 3
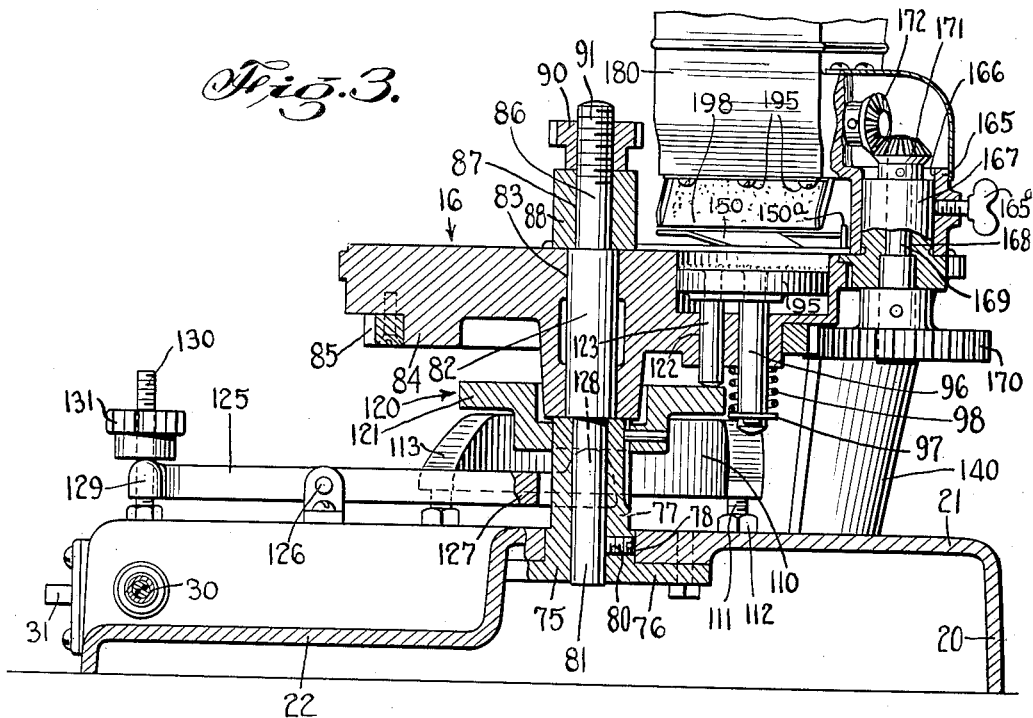
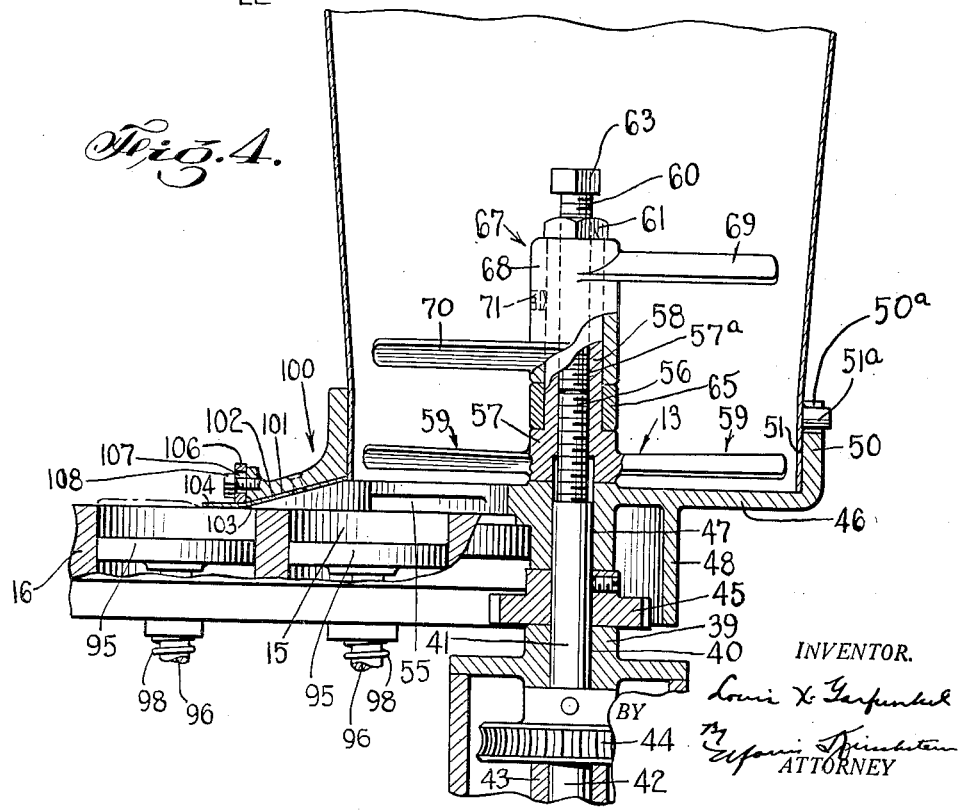

Patented May 23, 1933

1,911,016

UNITED STATES PATENT OFFICE

LOUIS X. GARFUNKEL, OF NEW YORK, N. Y.

MACHINE FOR PLASTIC MATERIAL

Application filed August 22, 1931. Serial No. 558,735.

This invention relates to machine for molding plastic material. More particularly, it relates to a machine wherein comminuted material is formed into cakes, balls or the like molded or shaped articles, such as meat balls, hamburger steaks, fish cakes, croquettes, and the like foods, and among the objects of this invention is to generally improve the construction of a machine of the character described, so as to provide a highly practical, economical and efficient device for the purposes described and specified.

A further object of this invention is to provide in a machine of the character described, improved means for readily and easily adjusting the size of the molded cakes.

A still further object of this invention is to provide in a machine of the character described, highly improved and novel means for removing the molded cakes from the molding means.

Another object of this invention is to provide in a machine of the character described, having a molding plate formed with a plurality of molds, highly improved means for finishing the tops of the cakes to provide a smooth surface therefor.

Still another object of this invention is to provide an extremely compact and rugged machine of the character described, having comparatively few and simple parts, easy to manufacture and assemble, which shall be smooth and positive in operation, easy to manipulate and adjust, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention, Fig. 1 is a front elevational view of a machine embodying the invention;

Fig. 2 is a top plan view of the machine shown in Fig. 1;

Fig. 3 is a cross-sectional view taken on line 3—3 of Fig. 2;

Fig. 4 is a cross-sectional view taken on line 4—4 of Fig. 2;

Fig. 5 is a cross-sectional view taken on line 5—5 of Fig. 2;

Fig. 6 is a cross-sectional view taken on line 6—6 of Fig. 5;

Fig. 7 is a cross-sectional view taken on line 7—7 of Fig. 2; and

Figure 1:
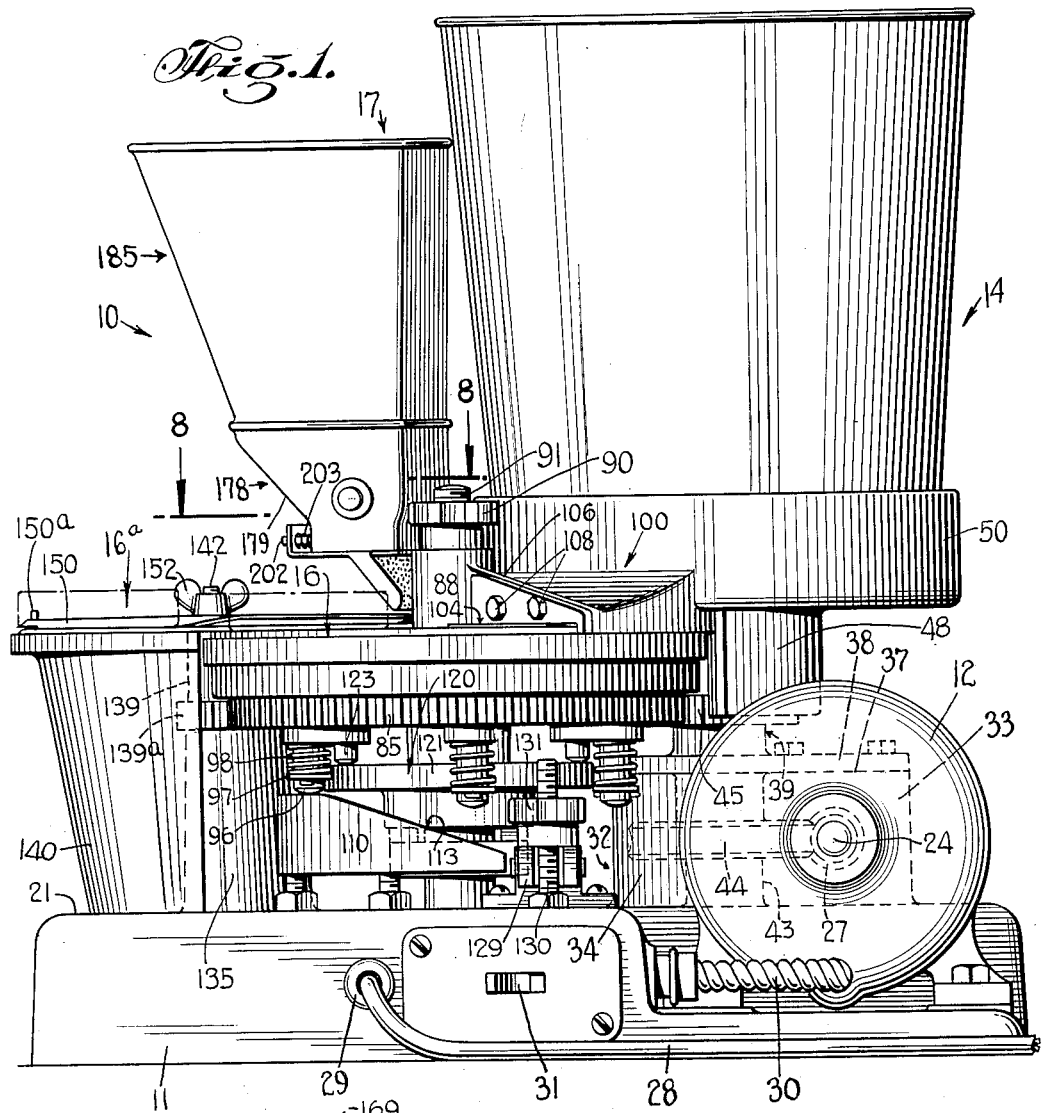
Figure 8:
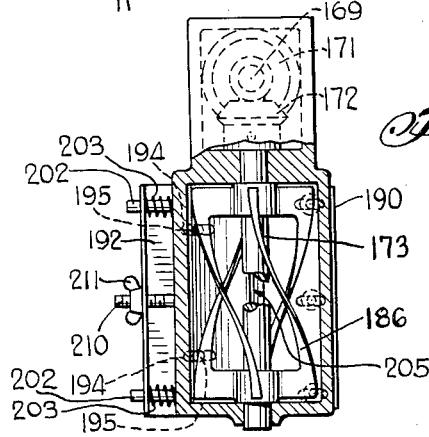
Fig. 8 is a cross-sectional view taken on line 8—8 of Fig. 1.

Referring now in detail to the drawings, 10 designates a machine embodying the invention here shown in the form of a device for molding plastic or comminuted material to form cakes, such as hamburger steaks, fish balls, croquettes, or the like shaped foods. The machine 10 comprises generally a base 11 on which is mounted an electric motor 12, adapted to rotate a propeller 13 disposed within a hopper 14 for feeding comminuted material within said hopper into the molds 15 of a rotary molding plate 16, likewise driven by said motor. For removing the molded cakes from the molding plate 16, there is provided a device 16a driven by said motor 12 and adapted to convey said cakes to any suitable receptacle. For sprinkling powdered material on the mold plate to coat the undersurface of the cakes, a device 17 is provided also actuated by the motor 12.

The base 11 may have a side wall portion 20, a raised platform or wall portion 21 and a depressed platform or wall portion 22 in one corner thereof. The motor 12 may be mounted on and attached to said depressed platform portion 22 in any suitable manner. Extending from said motor is a horizontal central rotary shaft 24 connected by a coupling 25 to a coaxial shaft 26 carrying a worm 27. Electric power may be supplied to the motor 12 in any suitable manner, for example, by means of a duplex cable 28 extending into the base 11 through an opening 29 formed therein, and connected to the motor by an armored cable 30. A switch 31 mounted on the base 11 is interposed in said cable 28 for starting or stopping the motor.

Integrally formed with the upper portion 21 of said base 11 is an upstanding housing 32 having a vertical wall portion 33 and a vertical U-shaped portion 34. Said shaft 26 preferably extends through, and is journalled within, the opposite side wall portions 35 and 36 of said U-shaped wall 34. Attached to the upper edge 37 of said housing 33 is a top plate 38 having a thickened boss portion 39 formed with a vertical opening 40. Journalled within said opening 40 is a vertical upstanding shaft 41, the lower end 42 whereof is journalled in a member 43 integrally formed with said housing 33 and provided with a central opening for receiving said end portion 42. A gear member 44 mounted on said shaft 41 is disposed between and in engagement with the members 43 and 39 and fixed to said shaft, said gear meshing with said worm 27 and serving to prevent axial movement of the shaft 41. Mounted on said shaft 41 and contacting the upper surface of the boss 39 is a spur gear 45 for the purpose explained hereinafter.

Mounted on said gear 45 is a bottom plate 46 for the hopper 14, and plate having a central vertical opening 47 forming a bearing opening for said shaft 41. The plate 46 may be formed with a downwardly extending skirted portion 48 partially surrounding and housing said spur gear 45. Extending upwardly from the outer edges of said plate 46 is an annular rim portion 50 adapted to receive the bottom edge portion 51 of the hopper 14. Said rim 50 may be provided with a notch 50a receiving a pin 51a fixed to said hopper, for preventing rotation of said hopper. Said plate 46 is provided for the purpose hereinafter described, with an eccentric opening 55 through which comminuted material placed within the hopper passes to the mold openings 15. The upper end of the shaft 41 may be formed with a screw threaded portion 56, and the propeller 13 formed with a central boss 57 from which there extends upwardly a sleeve 58, said boss and sleeve being formed with an internal screw threaded opening 57a adapted to engage the threads of said portion 56. Extending outwardly from said boss 57 are a plurality of inclined vanes 59 for forcing the plastic material downwardly through said opening 55 when the shaft 41 rotates. It will be noted that the screw threaded portion 56 extends only partially into the interior of the sleeve 58. A screw 60 is screwed into the upper end of said sleeve and is provided with a lock nut 61 for limiting the position of said screw 60 with respect to the sleeve 58. The direction of the threads 57a is such that upon operating the motor, for rotating the shaft 41, the propeller pressing down on the comminuted material, will be screwed upwardly on the screw 56. Obviously, the propeller will move upwardly until the bottom end of the screw 60 contacts the upper end of the screw threaded portion 56. In this manner, the vertical position of the propeller 13 or the distance of said propeller from the plate 46, will be adjusted. For example, if it is desired to raise the propeller, the latter is first screwed on portion 56 to the desired height. The lock nut 61 is then screwed backwardly to bring the same closer to the upper end or head 63 of said screw 60. The screw 60 may then be screwed deeper into the sleeve 58 until it contacts the upper end of the screw threaded portion 56, and the lock nut then again tightened down on the upper end of sleeve 58. During operation of the machine thereafter the propeller cannot move upwardly.

Received on said sleeve 58 and in contact with the boss 57, is a sleeve member 65 from which extends radially and vertically an arm 65a, the outer end of which is adapted to contact a stop member 65b attached to the inner wall of the hopper 14, said arm 65a being adapted to prevent rotation of the comminuted material within the hopper.

A member 67 having a central sleeve 68 may be mounted on the sleeve 58 and in contact with said sleeve 65. Extending outwardly from said sleeve 68 are a plurality of outwardly extending longitudinally spaced vanes 69 and 70. The member 67 may be fixed to the sleeve 58 by means of a set screw 71 in the well known manner. It will now be noted that the member 67 will rotate with the propeller 13; and the vanes 69 and 70 thereof serve to press the plastic material downwardly to prevent the formation of air pockets therein.

For mounting the molding plate 16 for rotation in a horizontal plane, there is provided a tubular member 75 (shown in Fig. 3), having a flange 76 attached to the underside of said wall portion 21, and a sleeve 77 extending upwardly from said flange and extending through an opening 78 formed in said wall 21. Fixed to said sleeve 77, as for example, by means of a set screw 80 is a vertical shaft 81 having an enlarged portion 82 contacting the upper end of the sleeve 77. Rotatably mounted on said shaft portion 82 is the molding plate 16. Said plate 16 is preferably annular in shape and is formed with a central opening 83 for receiving said shaft portion 82. The plate 16 preferably rests on the top of the sleeve member 77. It is provided with a downwardly extending annular flange 84, to which there is attached a spur gear 85 adapted to mesh with said spur gear 45, whereby said molding plate may be driven by said motor. The upper end 86 of the shaft 81 preferably extends through the central opening 87 of a boss 88 integrally formed with and extending from said bottom plate 46 of the hopper. A hand nut 90 on the upper screw threaded end portion 91 of the shaft portion 86 serves to prevent vertical movement of the molding plate 16, and further serves to retain the bottom plate 46 rigidly in position.

The molding plate 16 is formed with a plurality of equiangularly spaced cylindrical vertical mold openings 15 so positioned that upon rotating the mold plate, the openings are adapted to successively pass directly beneath the opening 55 in the hopper plate 46, whereby the plastic material may be forced through said opening 55 into the mold openings 15. Each mold opening 15 is formed with a bottom wall 93 provided with axial bores 94; and slidably extending through each of said bores 94 is a stem 96 to the upper end of which there is attached a circular disc or piston 95 having a snug sliding fit with the inner wall or surface of the mold opening. A washer 97 is attached to the bottom end of each stem 96; and a coil compression spring 98 is interposed between said washer and the undersurface of said bottom wall 93 whereby said piston is normally urged toward said bottom wall.

The plate 46 is provided with a horizontal integral extension 100 formed with a sloping undersurface 101, said undersurface however, being circular in shape and following the path of the mold openings during rotation of the mold plate, so that the plastic material forced through the opening 55 will contact the ramped or sloping surface 101 and be gradually forced into the mold opening 15.

For smoothly finishing the tops of the cakes, there is provided a plate 102 preferably made of spring material attached to said extension 100 and contacting said undersurface 101. The plate 102 is adapted to extend forwardly beyond the front edge 103 of said extension 100 as at 104 and is adapted to press downwardly on the upper surface of said mold plate so as to smooth off the tops of the mold cakes before the cakes are ejected. To take up wear in the plate 104 and in the top of the molding plate 16, there is provided a member 106 which is adjustably attached to the front end portion 103 of said extension 100. The member 106 may be provided with a plurality of spaced vertical slots 107 from which there extends the shank of screw 108 received in screw threaded openings formed in said end portion 103. It will thus be seen that by loosening the screws 108, the plate 106 may be lowered or lifted to obtain a proper adjustment. The screws 108 may be tightened for retaining the plate 106 in any desired position.

It will be noted also that the plate 106 serves to press the forwardly extending portion 104 of the plate 102 downwardly against the molding plate, thus ensuring a proper downward force for smoothing off the tops of the molded cakes.

Means is provided for ejecting the cakes after they are formed. To this end, an arcuate cam 110 is mounted on said wall portion 21 and beneath the molding plate 16. Said cam 110 may be mounted on said wall 21 by means of screws 111 having lock nuts 112 whereby the height of the cam may be adjusted. The upper edge 113 of said cam 110 is curved or ramped and is adapted to engage the lower ends of stems 96. The cam is so arranged that the lower ends of the stems 96 will engage said cam for lifting the pistons as soon as said pistons have passed the forward edge 104 of the plate 102. Thus, the formed cake is ejected by means of the cam as soon as the cake has passed the plate 102. After the cakes have been ejected and removed from the molding plate the pistons within the molds from which the cakes have been ejected, will ride down the cam edge 113 so that each piston is in its lowermost position when its mold opening passes beneath the opening 55 in the hopper plate 46.

Means is provided for adjusting the thickness of the molded cakes. To this end there is slidably and non-rotatably mounted on said sleeve 77, a member 120 having an annular horizontal flange 121 underlying the plate 16. Each of the bottom walls 93 of the mold openings is formed with a vertical bore 122 parallel to and disposed inwardly of the bore 94. Slidably extending through each of said bores 122 is a pin 123 attached at the upper end thereof to the piston 95 and adapted to contact or rest on the upper surface of the flange 121. It will thus be seen that the member 120 serves to limit the downward movement of the pistons 95. Thus, when the stems 96 ride off the cam, the springs 98 normally tend to move the pistons toward the bottom of the mold openings. However, when the pins 123 strike the flange 121, further downward movement of the pistons is prevented. The member 120 in this manner, determines the thickness of a cake, which depends upon the height of the mold opening above the top surface of the piston 95.

For adjusting the thickness of the cake, there is provided a lever 125 pivoted mediate the ends thereof, as at 126, to the top wall 21. The inner end 127 of the lever 125 is in the shape of an arc of a circle having diametrically disposed, upwardly extending projections 128 contacting the underside of the member 120. The outer end 129 of the lever is bifurcated and extends about a vertical screw threaded member 130 fixed to said wall 21. A nut 131 on said screw 130 serves to adjust the position of the lever 125. Thus, for adjusting the machine to produce thinner cakes, the nut 131 is screwed downwardly for lifting the inner end 127 of the lever and causing the member 120 to be lifted to limit the downward movement of the pistons, and hence reduce the height of the mold openings above said pistons. It will be noted that the springs 98 cause the pistons to press down on the member 121, whereby the outer ends 129 of the lever will always be in contact with the underside of the nut 131. For increasing the thickness of the cakes, the nut 131 is unscrewed to permit the spring 98 to press the piston downwardly and cause the member 120 to be lowered.

The threads in the nut 131 and screw 130 constitute cammed means for causing pivotal movement of lever 125.

It will now be understood that the thickness of the cakes or in other words, the number of cakes per pound of comminuted material can be easily and readily regulated by merely adjusting the nut 130. Any suitable pointer may be attached to the nut 131 and a suitable scale (not shown) fixed to the wall portion 21, whereby the number of cakes per pound of plastic material may be indicated and directly read on the scale.

The mechanism 16a for removing the molded cakes from the molding plate comprises a projection 135 integrally formed with and extending upwardly from the wall portion 21. Said member 135 is provided with a vertical recess or bore 136 for receiving a fixed vertical shaft 137. Rotatably mounted on the upper end 138 of said shaft and resting on the open end of projection 135, is a sleeve 139 having a gear 139a at the lower end thereof, meshing with the teeth of an idler gear 139b suitably mounted and in turn meshing with the teeth of gear 85 so as to give sleeve 139 the same direction of rotation as plate 16 and whereby said sleeve 139 may be driven from the electric motor 12. Integrally formed with said wall portion 21 and fixed thereto in any suitable manner, is a conical shaped, outwardly and upwardly flaring housing 140, surrounding and housing said projection 135 and sleeve 139. The upper edge 141 of said housing 140 is preferably substantially at the same level as the upper end of the sleeve 139 and the upper surface of the molding plate 16. Extending upwardly from the upper end of the shaft portion 138 is a screw threaded portion 142, and mounted on the top of said sleeve 139 is a circular disc or plate 144 having a central opening receiving said screw threaded portion 142 therethrough. A pair of diametrically disposed upwardly extending pins 146 projecting from and integrally formed with said sleeve 139, are received within suitable openings 147 formed in said disc, whereby said disc 144 may be rotated simultaneously with said sleeve 139.

Mounted on top of said disc 144 is a member 150 having a central opening 151 receiving said screw threaded portion 142. A threaded wing nut 152 on said screw threaded portion 151 serves to press said member 150 downwardly against said disc 144. Said member 150 comprises a central portion and a pair of parallel extending portions 154. Each of said outwardly extending portions 154 comprises a portion 155 parallel to and spaced above the disc 144, and a portion 156 inclined to said disc, and formed with an edge adapted to contact the upper surface 144a of said disc, whereby as said disc is rotated, the portion 156 serves to scrape and clean said disc. The member 150 is preferably made of spring material so as to yieldingly press on the top surface of the disc. Fixed to the edge 141 of member 140 is an upwardly extending pin 150a adapted to engage an outer end of one of said vanes 154 to prevent rotation of said member 150.

The disc 144 is preferably provided with a beaded rim 160 at the outer periphery thereof, overlying said top edge 141 of housing 140. As the molded cakes are carried by the rotating molding plate into contact with the rim of the rotating disc, said disc will undercut the cakes and lift and carry the same off the molding plate. The disc 144 overlaps the molding plate as clearly shown in Figs. 2 and 5, and hence the molded cakes are carried to said disc. Since said disc substantially contacts the upper surface of the molding plate, the ejected cakes will be clearly undercut. That is, the rim 160 will contact the bottom surface of the ejected cakes and due to the rotation of said disc will carry said cakes off the molding plate. Any suitable receptacle may be placed in proper position for receiving the cakes as they are turned or carried off the molding plate. The cakes, it will be understood, will not remain on the disc 144, but will be thrown off by the tangential force of the rotating disc. With this construction, the application of cracker dust or the like powdered material to the bottom surface of the motor to minimize the friction between the cake and the molding plate is rendered unnecessary.

However, means is provided for applying the powdered material to the undersurface of the cake, as for example, when making fish cakes, or the like coated cakes. To this end, there is integrally formed with the hopper plate 46, a cylindrical extension 165 having a vertical bore 166. Fixed within said bore is a sleeve 167 formed with an axial bore 168. Mounted within said bore 168 is a vertical shaft 169 to the lower end of which there is attached a gear 170 meshing with said gear 85, whereby said gear 170 may likewise be driven from the electric motor 12. A set screw 165a serves to detachably attach said cylindrical sleeve 165 to sleeve 167.

To the upper end of the shaft 169 there is attached a beveled gear 171 meshing with a beveled gear 172 fixed to one end of a horizontal shaft 173. Said shaft 173 may be journalled in the opposite wall portions 175 and 176 of a chute member 178 preferably integrally formed with and extending from said hopper plate 46. The member 178 is formed with an inclined wall portion 179, a vertical wall portion 180 forming with the lower end of the chute a slot 181. A hopper or container 185 for cracker dust or the like powdered material, may be mounted on the chute 178. Attached to the shaft 173 is an agitating member 186 having a plurality of curved blades whereby upon rotation of said shaft, the dust will be agitated to provide a constant flow of powder through the slot 181.

For regulating the amount of cracker dust or powdered material dispensed, there is attached to the undersurface of the wall 180, a plate 190 having an edge portion extending into the slot 181. A member 192 provided with a portion 193 contacting the undersurface of the inclined wall 179, is slidably attached to said undersurface by means of a plurality of parallel slots 194, formed in said portion, through each of which there extends a screw 195, screwed to the undersurface of said wall 179. The member 192 is provided at one end thereof, with an integral inclined wall 198 for directing the powdered material to the mold openings 92. Extending upwardly from the outer edge of said portion 193 is an upstanding wall 200 formed with a plurality of spaced openings 201 and a pair of spaced pins 202 screwed to said wall 179 adapted to slidably project through said openings 201. A coil compression spring 203 is mounted on each of the pins 202 and interposed between the lower end of the wall 179 and the upstanding wall 200.

A screw 210 parallel to the pins 202, and fixed to said wall 179 of said chute slidably extends through an opening in said wall portion 200. A nut 211 screwed to said screw serves to limit outward movement of said member 192 for adjusting the width of the slot 205 between plate 190 and plate portion 132; thru which the powdered material may pass. By manipulating set screw 165a the entire duster 17 may be adjusted or removed.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

Having thus described my invention, I claim as new and desire to secure by Letters Patent:

1. In combination with a rotary molding plate having a plurality of spaced cylindrical mold openings therein, means for feeding comminuted material to said mold openings, a piston slidably mounted within each opening, a stem fixed to each piston and extending downwardly therefrom, a cam adapted to be engaged by said lower ends of said stems as said plate is rotated for lifting the pistons and ejecting the cakes formed within said mold openings, and a single means for limiting the downward movement of all of said pistons, said last named means comprising a slidably mounted annular member disposed beneath said molding plate, a member attached to each piston, said last named members being adapted to contact said annular member as said molding plate is rotated, and means for causing sliding movement of said annular member and retaining said annular member in any position to which the same is moved.

2. In combination, a base, a horizontal rotary plate mounted thereon having a plurality of spaced mold openings in the upper surface thereof, and a pair of vertical through openings communicating with each of said mold openings, a piston within each mold opening, a stem attached thereto and slidably extending through one of said pair of through openings, a pin attached to each piston extending through the other of said pairs of through openings, a cam adapted to be engaged by each of said stems, as said molding plate is rotated, for lifting said pistons, an annular member disposed beneath said molding plate adapted to engage the lower ends of said pins for limiting the downward movement of said pistons, and means for moving said annular member, including a member pivoted to said base, and screw threaded means for moving said pivoted member.

3. In combination, a horizontal rotary plate having a plurality of spaced mold openings in the upper surface thereof, and a pair of vertical through openings communicating with each of said mold openings, a piston within each mold opening having a stem slidably extending through one of said pair of through openings, and a pin attached thereto extending through the other of said pair of through openings, a cam adapted to be engaged by each of said stems, as said molding plate is rotated, for lifting said pistons, an annular member disposed beneath said molding plate adapted to engage the lower ends of said pins for limiting the downward movement of said pistons, and means for adjusting the vertical position of said annular member.

4. In combination, a horizontal rotary plate having a plurality of spaced mold openings in the upper surface thereof, and a pair of vertical through openings communicating with each of said mold openings, a piston within each mold opening having a stem slidably extending through one of said pair of through openings, and a pin attached thereto extending through another of said pair of through openings, a cam adapted to be engaged by each of said stems, as said molding plate is rotated, for lifting said pistons, an annular member disposed beneath said molding plate adapted to engage the lower ends of said pins for limiting the downward movement of said pistons, means for adjusting the vertical position of said annular member, and means for adjusting the vertical height of said cam.

5. In combination, a horizontal rotary plate having a plurality of spaced mold openings in the upper surface thereof, and a pair of vertical through openings communicating with each of said mold openings, a piston within each mold opening having a stem slidably extending through one of said pair of through openings, and a pin attached thereto extending through another of said pair of through openings, a cam adapted to be engaged by each of said stems, as said molding plate is rotated, for lifting said pistons, and an annular member disposed below said molding plate adapted to engage the lower ends of said pins for limiting the downward movement of said pistons, and means for adjusting the vertical position of said annular member, said means comprising a lever pivoted mediately the ends thereof and having an end portion adapted to contact the underside of said annular member, and screw threaded means for adjustably moving the opposite end of said lever.

6. In a machine of the character described, in combination with a rotary plate, having a plurality of mold openings therein, a hopper having an opening in the bottom wall thereof, means for feeding comminuted material within said hopper through said opening in said bottom wall to said mold openings, means for ejecting the cakes formed within said mold openings and means for removing said cakes from said molding plate, said last named means comprising a flat, thin, rotary disc having a portion overlapping and substantially contacting the upper surface of said molding plate and adapted to undercut said ejected cakes.

7. In a machine of the character described, in combination with a rotary plate, having a plurality of mold openings therein, a hopper having an opening in the bottom wall thereof, means for feeding comminuted material within said hopper through said opening in said bottom wall to said mold openings, means for ejecting the cakes formed within said mold openings and means for removing said cakes from said molding plate, said last named means comprising a rotary disc having a portion overlapping and substantially contacting the upper surface of said molding plate, said disc being formed with a peripheral bead for lifting the cakes from the molding plate.

8. In combination with a rotary plate having a mold opening therein, means for feeding plastic material to said opening, means within said opening for ejecting the cake formed therein and means for removing the cake from said molding plate, said last named means comprising means for undercutting said cake, said last named means comprising a disc having a portion overlapping said molding plate and substantially contacting the upper surface thereof and rotating in the same direction as said molding plate.

9. In combination with a rotary plate having a mold opening therein, means for feeding plastic material to said opening, means within said opening for ejecting the cake formed therein and means for removing the cake from said molding plate, said last named means comprising means for undercutting said cake, said last named means comprising a disc having a portion overlapping said molding plate and substantially contacting the upper surface thereof and rotating in the same direction as said molding plate, and a member resiliently pressing against the upper surface of said disc.

10. In a machine of the character described, in combination, a base, a motor mounted thereon and having a horizontal rotary shaft, a worm on said shaft, a vertical shaft having worm wheel meshing with said worm, a spur gear mounted on said vertical shaft, a molding plate having a plurality of mold openings therein, a spur gear fixed to said molding plate and meshing with said first mentioned spur gear, means on said vertical shaft for feeding plastic material to said mold openings to form cakes, means for ejecting said cakes, means for feeding powdered material to said mold openings, including a rotary member having a beveled gear at one end thereof, a vertical shaft having a beveled gear at the upper end thereof, meshing with said first mentioned beveled gear and a spur gear at the lower end thereof meshing with said first mentioned spur gear, a thin, rotary disc for removing the formed cakes from said molding plate, adapted to undercut the ejected cakes, and a spur gear attached thereto and meshing with the gear on said molding plate.

11. In combination with a rotary molding plate formed with a plurality of annularly spaced mold openings therein, means for feeding material to said mold openings, a piston slidably mounted within each opening, cam means for lifting the pistons to eject the molded material from said openings, means for limiting the stroke of said pistons, comprising an annular member adapted to be contacted by said pistons during rotation of said plate, and screw threaded means for lifting and lowering said annular member.

12. In combination with a rotary molding plate formed with a plurality of annularly spaced mold openings therein, means for feeding material to said mold openings, a piston slidably mounted within each opening, cam means for lifting the pistons to eject the molded material from said openings, means for limiting the stroke of said pistons, comprising an annular member adapted to be contacted by said pistons during rotation of said plate, and means for lifting and lowering said annular member, said means comprising a member engaging said annular member and a screw threaded member having engagement with said last member and adapted to actuate the latter member upon turning said screw threaded member.

13. In a machine of the character described, in combination, a base, a motor mounted thereon and having a horizontal rotary shaft, a worm on said shaft, a vertical shaft having a worm wheel meshing with said worm, a spur gear mounted on said vertical shaft, a molding plate having a plurality of mold openings mounted for rotation about a vertical axis spaced from and parallel to said vertical shaft, a gear on said molding plate meshing with said spur gear, a hopper received on said vertical shaft, rotary means on said vertical shaft for feeding material in said hopper to said mold openings to form cakes, means for ejecting said cakes, a flat, thin disc mounted for rotation on a vertical axis adapted to undercut said cakes, having an overlapping portion adapted to substantially contact said molding plate, and geared means meshing with the gear on said molding plate for rotating said disc.

14. In a machine of the character described, in combination with a rotary plate, having a plurality of mold openings therein, a hopper having an opening in the bottom wall thereof, means for feeding comminuted material within said hopper through said opening in said bottom wall, to said mold openings, means for ejecting the cakes formed within said mold openings, and means for removing said cakes from said molding plate, said last named means comprising a rotary disc having a portion overlapping and substantially contacting the upper surface of said molding plate, and a guard for said disc having a portion disposed adjacent the edge of the disc extending beyond said molding plate.

15. In combination with a rotary plate having a mold opening therein, means for feeding plastic material to said opening, means within said opening for ejecting the cake formed therein and means for removing the cake from said molding plate, said last named means comprising means for undercutting said cake, said means comprising a rotary disc overlapping and substantially contacting said plate, and a fixed guard having a member substantially contacting the portion of the disc extending beyond said plate.

16. In combination, a horizontal rotary plate having a plurality of spaced mold openings, a piston within each mold opening, a cam adapted to engage said pistons for lifting the same within said mold openings as said molding plate is rotated, an annular member disposed below said molding plate for limiting the downward movement of said pistons, and means for adjusting the vertical position of said annular member, said means comprising a lever having a portion supporting said annular member, and screw threaded means engaging said lever for moving the same to adjust the position of said annular member.

17. A machine of the character described comprising a base, a rotary molding plate mounted thereon and formed with a plurality of annularly spaced mold openings, means for feeding material to said mold openings to form cakes, a piston slidably mounted within each opening, cam means for lifting said pistons to eject said molded cakes from said openings, and means for limiting the stroke of said pistons comprising a slidably mounted annular member beneath said molding plate, and adapted to be contacted by said pistons during rotation of said plate, and means for slidably moving said annular member, said means comprising a member rotatably mounted on said base and operatively connected to said annular member for lifting the latter upon rotating the former.

In testimony whereof I affix my signature.

LOUIS X. GARFUNKEL.